United States Patent [19]

Kinoshita et al.

[11] 4,413,965
[45] Nov. 8, 1983

[54] PELLETIZING DEVICE FOR PLASTIC MATERIAL

[75] Inventors: Tomoo Kinoshita; Minoru Hinuma, both of Tokyo, Japan

[73] Assignee: Nihon Repromachine Kogyo Kabushiki Kaisha, Tokyo, Japan

[21] Appl. No.: 382,610

[22] Filed: May 27, 1982

[30] Foreign Application Priority Data

May 8, 1981 [JP] Japan .................................. 56-68294

[51] Int. Cl.³ .............................................. B29C 25/00
[52] U.S. Cl. .................................. 425/71; 264/178 R; 264/143; 425/224; 425/291; 425/302; 425/315
[58] Field of Search ................ 264/175, 178 R, 147.1, 264/DIG. 47, 140, 141, 149, 143; 525/67, 71, 224, 291, 302, 315

[56] References Cited

U.S. PATENT DOCUMENTS

| 2,274,260 | 2/1942 | Schelhammer et al. | 264/175 |
| 2,624,913 | 1/1953 | Montross et al. | 264/178 R |
| 2,638,631 | 5/1953 | Stott et al. | 264/175 |
| 3,085,292 | 4/1963 | Kindseth | 264/175 |
| 3,250,834 | 5/1966 | Collins | 264/143 |
| 3,414,939 | 12/1968 | Gingwin | 264/178 F |
| 3,646,713 | 3/1972 | Marshall et al. | 264/144 |
| 3,810,729 | 5/1974 | Patchell | 264/DIG. 47 |
| 4,012,188 | 3/1977 | Lemelson | 264/175 |
| 4,079,114 | 3/1978 | Bonner | 264/DIG. 47 |

FOREIGN PATENT DOCUMENTS

| 108465 | 11/1958 | Pakistan | 264/175 |
| 668289 | 3/1952 | United Kingdom | 264/144 |

*Primary Examiner*—Jay H. Woo
*Attorney, Agent, or Firm*—Oblon, Fisher, Spivak, McClelland & Maier

[57] ABSTRACT

An unmanned pelletizing device for plastic material for preventing the breakage of strands of the plastic material formed between a cooling roll and a pinch roll. The cooling roll is partially submerged in a tank of cooling water. A cutter includes a fixed knife having a plurality of grooves formed therein for registration with the plastic strands.

1 Claim, 6 Drawing Figures

FIG. 3
FIG. 2
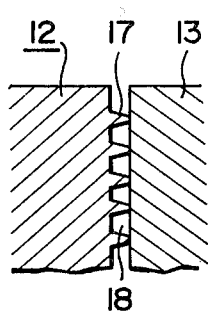
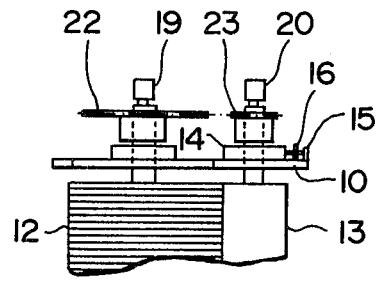
FIG. 4  FIG. 5  FIG. 6
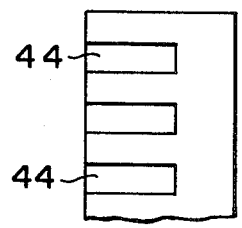
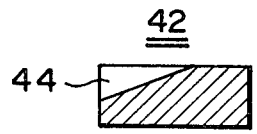
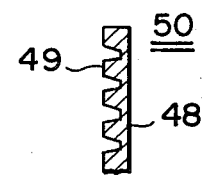

PELLETIZING DEVICE FOR PLASTIC MATERIAL

BACKGROUND OF THE INVENTION

1. Field of the Invention

This invention relates to a pelletizing device for plastic material and more particularly to a relatively compact device which prevents breakage of strands of the plastic material.

2. Description of the Prior Art

Conventional granulation of plastic materials has been implemented by extruding many strands of material through dies by an extruder and cutting them by a hot cut system or a cold cut system to make pellets. The conventional device requires more installation cost and is mostly used for pelletizing virgin material. Pelletizing of reclaimed material has usually been effected by a cold cut system.

The cold cut system draws many strands of material (about 2 to 4 mm dia.) being extruded through strand dies of an extruder. The strands are sufficiently cooled by passing through a cooling water tank by way of a drawing roll of a chop cutter, which cuts the strands for granulation. By the above system, strands are apt to be broken by uneven extrusion of the extruder, or disturbance of extrusion balance by the extruder or balance of drawing by the inclusion of foreign materials even when only one of the strands is broken and abandoned. The broken strand solidifies in the cooling water tank and may cause trouble. Consequently, attendance of an operator is always necessary for watching the operation which cannot be unattended contrary to the man-hour saving requirements of modern age. Further, because of the necessity of a long cooling water tank of 2 to 4 meter long, the conventional equipment requires a larger space for installation.

SUMMARY OF THE INVENTION

This invention aims to improve the weak points of conventional machines as stated above and to offer an unmanned plastics pelletizing machine which prevents the breaking of strands during operation, and which requires a smaller installation space to allow for the reduction of running costs.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 2 is a plan view of a part of the cooling roll;

FIG. 3 is an enlarged sectional view of the cooling roll and the pressing pinch roll;

FIG. 4 is a plan view of the fixed knife;

FIG. 5 is a sectional view of the fixed knife; and

FIG. 6 is a sectional view of the sheet material.

DETAILED DESCRIPTION OF THE PREFERRED EMBODIMENTS

Figure 1:
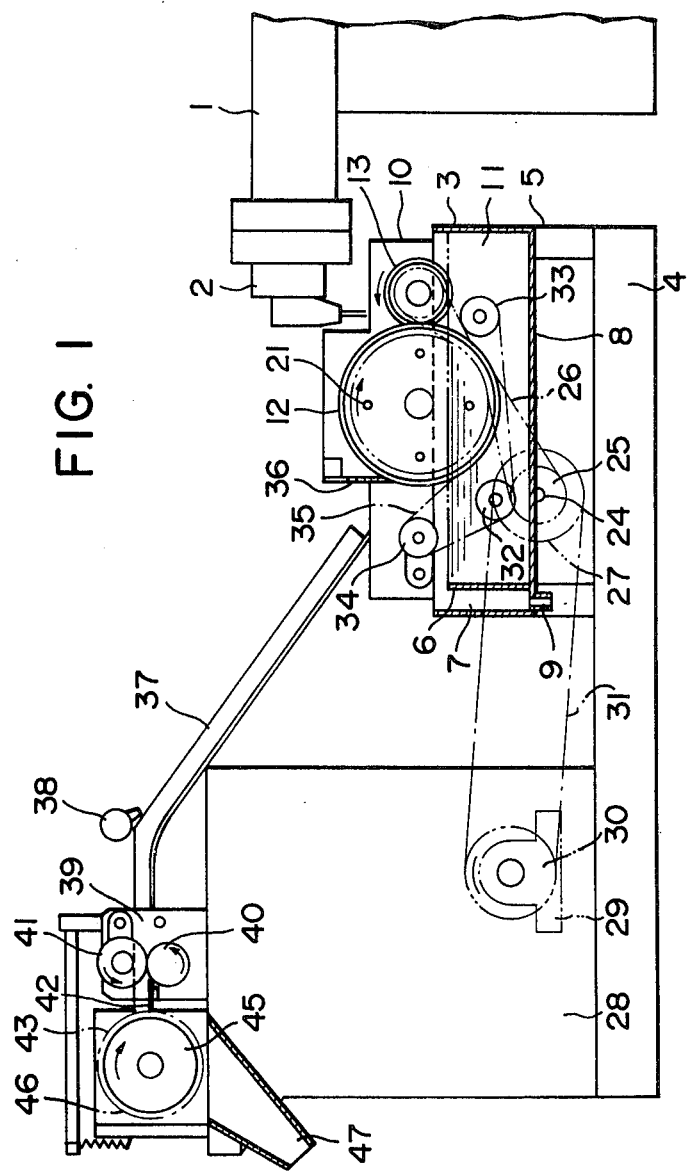
FIG. 1 is an elevation view partly in section.

The apparatus developed in accordance with the present invention will now be described in conjunction with the accompanying Figures, within which, for example, a T-die 2 for the sheet material is attached to the end of an extruding machine 1 and a cooling water tank 3 is installed under the T-die 2.

The cooling water tank 3 is attached to an end of the base frame 4 through a trestle 5. A waste water passage 7 is formed between a partition wall installed inside of the cooling water tank at one side thereof and a little lower than the outer wall of the tank. A drain port 9 is included in the bottom plate 8.

Side plates 10, 10 are projectingly fixed to both side walls of the cooling water tank 3. Both the side plates 10, 10 are made to support a cooling roll 12 to rotate freely and to place a part of the roll in the cooling water 11 held in the cooling water tank 3. A pressing pinch roll 13 is also supported by both the side plates 10, 10 to rotate freely and confront the cooling roll 12. Bearings 14 of the pressing pinch roll 13 are fixed with adjusting screws 15, which are thread fitted with nuts 16 projectingly installed to the side plates 10, 10, so that the pressure of the pressing pinch roll 13 against the cooling roll 12 can be adjusted.

The cooling roll 12 is prepared with many grooves 18 of desired width, for example 2 to 4 mm, by way of the tapered projection 17 of a small width, for example 0.2 to 0.5 mm, as shown in FIGS. 2 and 3. The shafts of the cooling roll 12 and the pressing pinch roll 13 are respectively installed with rotary joints 19 and 20, so that cooling water can be introduced into the rolls. Both sides of the cooling roll 12 are prepared with a plurality of drain holes 21 for the discharging of cooling water from the roll so that a cooling effect is fully effected.

The shafts of the cooling roll 12 and the pressing pinch roll 13 are attached with chain wheels 22 and 23 which are installed outside of the cooling water tank. A chain band 26 is hooked to a chain wheel 25 mounted on a driven shaft 24 and above chain wheel 23. The chain band 26 is also engaged with the chain wheel 22 so that both the rolls will rotate in the direction as indicated with the arrow marks shown in FIG. 1. Another chain wheel 27 is also mounted on driven shaft 24 and is driven by a chain wheel 30 of a driving motor with a change gear 29 installed in a trestle for a chop cutter 28 installed on the base frame 4.

In the interior of the cooling water tank 3, two pulleys 32 and 33 are installed to the underside of the cooling roll 12. A pulley 34 is supported by both side plates 10, 10 placed to the sides of the cooling roll 12 to rotate freely. The pulleys 32, 33 and 34 are connected by a guide belt 35 which is contacting the lower surface of the cooling roll 12.

Numeral 36 in FIG. 1 is a scraper board fixed to both the side plates 10, 10, the lower edge of which is contacting the sides of the cooling roll 12.

A guide flume 37 is installed between the upper side of the pulley 34 and the trestle for the chop cutter 28. An air knife for hydro-extraction 38 is installed at the upper side of the exit side of the guide flume 37.

Trestles 39, 39 are fixed to both sides of the guide flume 37 on the trestle for the chip cutter 28. A drawing roll 40 and a drawing guide roll 41 are confrontingly attached to the trestles 39, 39. A fixed knife 42 is installed at the exit side of the drawing guide roll 41. A rotary knife 43 is installed adjacent to the fixed knife 42. The fixed knife 42 includes many tapered grooves 44 disposed at a certain space with respect to its upper surface as shown in FIGS. 4 and 5. The rotating knife 43 is formed to fix a plurality of knives 46 at a predetermined space on the rotating roll 45. Numeral 47 in FIG. 1 is a pellet exit flume.

The exemplary embodiment is structured as stated above, and operates as follows. Plastic material extruded from T-die 2 falls on the pressing pinch roll 13 in a sheet form, is rolled between the pressing pinch roll 13 and the grooved cooling roll 12 and is formed to the sheet shaped material 50 shown in FIG. 6, one side of which is connected by a thin film (0.1 to 0.2 mm) joint 48 and the other side having projections 49 only for those portions corresponding to the grooves 18 of the cooling roll. Sheet material 50 thus formed is transferred by the guide belt 35 in the cooling water tank 3 and cooled with cooling water 11. The sheet material passes through the guide flume 37, and is drawn by the drawing roll 40 and the drawing guide roll 41. The sheet material 50 is then drained and dried by the air knife 38 for hydro-extraction as it travels through the guide flume 37. The material is then cut to a certain predetermined length by the fixed knife 42 and the rotary knife 43.

During the above cutting process, projections 49 of the material 50 are registered with the tapered grooves 44 of the fixed knife 42 such that the lower end of the projections 49 come down to enter the tapered grooves 44 when the material is cut by the rotary knife 43. This lowering action breaks the thin joint 48 to separate each projection 49 apart, producing chops by the cutting process to be followed.

Because this invention is constructed and acts as set forth above in the exemplary embodiment and because the material is transferred in a sheet form until it is subjected to the cutting process, the material can be transferred safely and surely. That is, the material does incur broken strands as in the conventional systems, even under an unbalanced draw at the cutting process caused by uneven extrusion or inclusion of foreign materials.

Therefore, troubles caused by the solidifying of broken strands in the cooling water tank a experienced in conventional systems are eliminated and the personnel required for watching are unnecessary thereby resulting in man-hour savings.

Because of the sheet form of the material, there is no breakage during the transfer as described. Therefore, the cooling water tank 3 can be made smaller, and consequently the space for installation can be reduced.

Further, because of the grooves formed in the fixed knife, the projections of the sheet become separated in pieces at the time of cutting, to facilitate chip formation.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A pelletizing device for plastic material comprising:

a T-die for extruding said plastic material into a sheet;

a cooling water tank disposed beneath said T-die;

a cooling roll having a plurality of first annular projections and first annular grooves formed in a surface portion of said roll for forming a corresponding profile of second projections and second grooves in said sheet of said plastic material, said cooling roll being partially submerged in said cooling water tank;

a pinch roll disposed adjacent to and coacting with said cooling roll to form said sheet;

a guide belt containing a lower surface portion of said cooling roll for transferring said sheet of said plastic material from said T-die, between said T-die, between said cooling roll and said pitch roll and away from said cooling roll;

a guide flume having an entrance and an exit and being disposed adjacent to an upper surface portion of said guide belt such that said entrance receives said sheet material from said cooling roll;

a fixed knife blade disposed above said exit of said guide flume and having a plurality of third grooves formed therein such that second projections formed in said sheet of said plastic material in said guide flume are positioned so as to correspond to said third grooves; and a rotary knife having a plurality of blades connected thereto at predetermined intervals and wherein said rotary knife is juxtaposed with said fixed knife blade, whereby the coaction of said fixed knife blade and said rotary knife breaks said sheet along said grooves to form strips, and cuts said strips.

* * * * *